(12) United States Patent
Barberan Latorre

(10) Patent No.: US 12,128,603 B2
(45) Date of Patent: Oct. 29, 2024

(54) METHOD AND DEVICE FOR OBTAINING A RAISED PATTERN ON A SUBSTRATE

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 565 days.

(21) Appl. No.: 17/296,947

(22) PCT Filed: Dec. 3, 2018

(86) PCT No.: PCT/ES2018/070773
§ 371 (c)(1),
(2) Date: May 25, 2021

(87) PCT Pub. No.: WO2020/115337
PCT Pub. Date: Jun. 11, 2020

(65) Prior Publication Data
US 2022/0024113 A1 Jan. 27, 2022

(51) Int. Cl.
*B29C 59/02* (2006.01)
*B41C 1/00* (2006.01)
*B41J 3/28* (2006.01)
*B29L 31/00* (2006.01)

(52) U.S. Cl.
CPC ............ *B29C 59/022* (2013.01); *B41C 1/003* (2013.01); *B41J 3/28* (2013.01); *B29L 2031/722* (2013.01)

(58) Field of Classification Search
CPC ..... B29C 64/147; B29C 59/04; B29C 59/043; B29C 59/046; B29C 59/022; B41J 3/38; B41J 3/28; B41C 1/003
See application file for complete search history.

(56) References Cited

U.S. PATENT DOCUMENTS

| | | | | |
|---|---|---|---|---|
| 3,660,200 | A * | 5/1972 | Anderson | D06M 17/06 |
| | | | | 156/278 |
| 5,441,838 | A * | 8/1995 | Pane | G03G 15/6585 |
| | | | | 430/97 |
| 9,636,941 | B2 * | 5/2017 | Peleg | B41C 1/003 |
| 2004/0183796 | A1 | 9/2004 | Velde et al. | |

(Continued)

FOREIGN PATENT DOCUMENTS

| EP | 2388146 A2 | 11/2011 |
|---|---|---|
| EP | 2412516 A2 | 2/2012 |

(Continued)

OTHER PUBLICATIONS

International Search Report for PCT/ES2018/070773 dated Aug. 21, 2019 and English translation; 8 pages.

*Primary Examiner* — Jamel M Nelson
(74) *Attorney, Agent, or Firm* — LUCAS & MERCANTI, LLP

(57) ABSTRACT

A method for obtaining a raised pattern on a substrate and to the device used, wherein the method includes the following steps of moving a substrate having one face; supplying a film with a first face; projecting onto the first face a raised-pattern product using digital printing technology so as to generate a positive raised pattern on the first face; fixing the positive raised pattern on the film; applying an overlay product; obtaining a negative raised pattern on the overlay product by contact with the positive raised pattern; and fixing the negative raised pattern on the face of the substrate.

11 Claims, 8 Drawing Sheets

(56) References Cited

U.S. PATENT DOCUMENTS

| | | |
|---|---|---|
| 2012/0175820 A1 | 7/2012 | Wagner et al. |
| 2014/0083315 A1 | 3/2014 | Sandler et al. |
| 2014/0283699 A1* | 9/2014 | Peleg .................. G03G 15/224 |
| | | 118/696 |

FOREIGN PATENT DOCUMENTS

| | | | |
|---|---|---|---|
| JP | 2005119285 A | 5/2005 | |
| JP | 2012-31388 A | 2/2012 | |
| WO | WO-2008047127 A1 * | 4/2008 | ......... B29C 33/3878 |

* cited by examiner

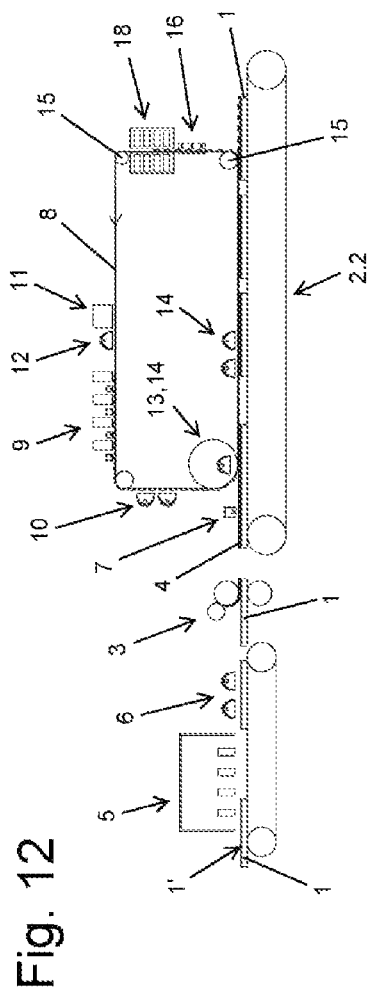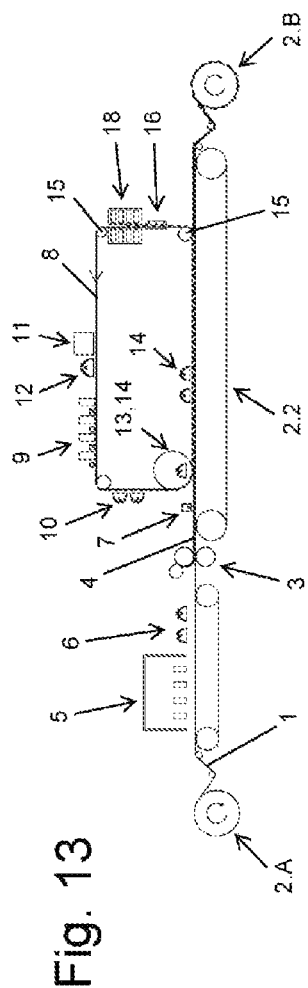

METHOD AND DEVICE FOR OBTAINING A RAISED PATTERN ON A SUBSTRATE

CROSS REFERENCE TO RELATED APPLICATION

This Application is a 371 of PCT/ES2018/070773 filed on Dec. 3, 2018, which is incorporated herein by reference.

TECHNICAL FIELD

The invention is related to the industry dedicated to generating raised patterns on substrates.

STATE OF THE ART

Forming raised patterns on substrates is currently known, the substrates being configured as panels and being made of a material that can be selected from, for example, wood (chipboard, medium-density fibres "MDF", high-density fibres "HDF" or plywood), plastic (PVC), cellulose-based materials (paper or cardboard) and metal.

Nowadays, in order to obtain a good result when reproducing natural materials, such as wood or stone, in addition to the image, it is necessary to reproduce the raised patterns of said natural materials in order to obtain high similarity also to the touch.

A known solution comprises first applying a material in the form of a film or layer on a face of the substrate, in order to then exert pressure on said face of the substrate through a pressure element such as a mould, a roller or similar. The pressure element has a positive engraving or raised pattern, which by pressure is transferred inversely, in other words, as a negative raised pattern, to the film applied onto said face of the substrate. A major drawback, among others, of this solution lies in the fact that it is not very flexible since in order to change the engraving to be transferred to the substrate, the corresponding pressure element must be changed.

Other known solutions, which provide flexibility in the reproduction of raised patterns, comprise applying onto the corresponding face of the substrate a layer of a plastic material, of a film type, which incorporates a raised pattern. Accordingly, the film is supplied from a reel and the raised pattern incorporated by said film is transferred to the film arranged on the face of the substrate by means of pressure. The film can have a length such that it provides greater variety in the raised pattern than a contact surface of the roller or the mould as the pressure element. Furthermore, once the desired film has been selected, and in the event that the engraving to be transferred to the substrate is to be changed, only the corresponding reel must be changed, which is lighter and quicker to replace. However, these last solutions do not quite provide the degree of flexibility demanded by the market. The market, on many occasions, requires little or even no repetition of a pattern associated with the negative raised pattern or arranged on the corresponding face of the substrate.

In view of the described disadvantage or limitation presented by the currently existing solutions, a solution is necessary which enables the degree of flexibility to be increased when providing the raised pattern to the substrate.

OBJECT OF THE INVENTION

In order to meet this objective and solve the technical problems discussed so far, in addition to providing additional advantages that may be derived later, the present invention provides a method and a device for obtaining a raised pattern on a substrate.

The method comprises moving a substrate having one face; supplying a film with a first face, optionally according to a closed path; projecting onto the first face a raised-pattern product using digital printing technology so as to generate a positive raised pattern on the first face; fixing the positive raised pattern on the film; applying an overlay product; obtaining a negative raised pattern on the overlay product by contact with the positive raised pattern; and fixing the negative raised pattern on the face of the substrate.

In this manner, maximum flexibility is provided in the generation of the raised pattern, as well as in possible changes in said raised pattern, as it is continuously generated on the film.

According to the method, a print is arranged on the face of the substrate, information about the print being sent such that the generation of the positive raised pattern and the arrangement of the print are performed in a synchronised manner.

Preferably, once the negative raised pattern has been obtained on the overlay product, the negative raised pattern is fixed. Alternatively, obtaining the negative raised pattern and fixing the negative raised pattern occur simultaneously.

The overlay product is eliminated from the film, preferably once the negative raised pattern has been fixed. Additionally or alternatively, the positive raised pattern is eliminated from the film once the negative raised pattern has been fixed. This elimination of the positive raised pattern from the film can be both after removing the overlay product from the film or without it being removed.

Optionally, the film is removed with respect to the substrate. Accordingly, the film is preferably removed after completely curing the overlay product with the negative raised pattern on the face of the substrate. Alternatively, the film is removed before completely curing the overlay product with the negative raised pattern on the face of the substrate.

Preferably, the overlay product is applied onto the face of the substrate. Additionally or alternatively, the overlay product is applied onto the film on the first face.

The device comprises movement means for moving the substrate through the device; application means for applying an overlay product; supply means for supplying a film with a first face; projection means, which use digital printing technology, for projecting a raised-pattern product so as to generate a positive raised pattern on the first face; fixing means for fixing the positive raised pattern on the film; transfer means for obtaining a negative raised pattern on the substrate; and, control means designed to perform the method according to any of the preceding claims. Optionally, the device further comprises removal means for removing the film with respect to the substrate.

DESCRIPTION OF THE FIGURES

FIGS. 6 to 13 show schematic views of the device for obtaining raised patterns on substrates object of the invention, according to different exemplary embodiments.

DETAILED DESCRIPTION OF THE INVENTION

Figure 1:
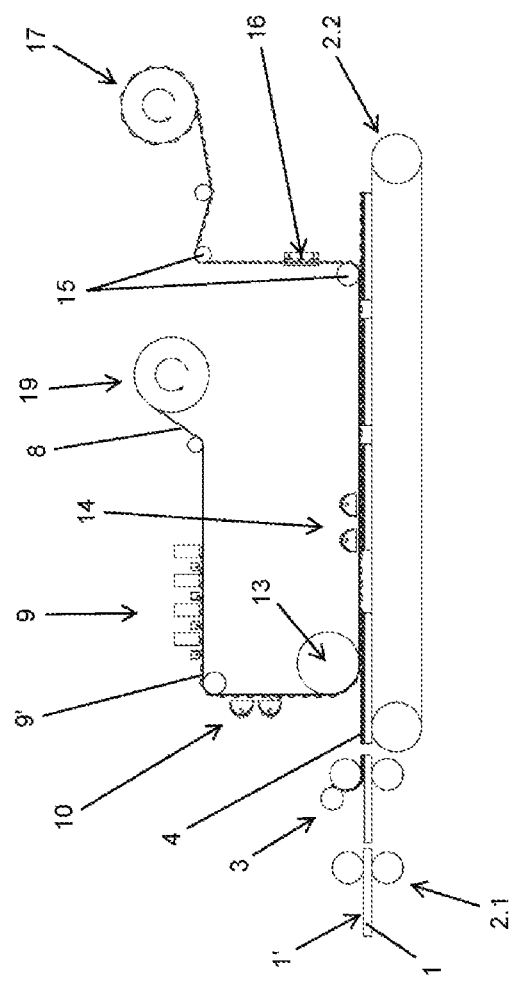
FIG. 1 shows a schematic view of a device for obtaining raised patterns on substrates object of the invention, according to an exemplary embodiment.
Figure 4:
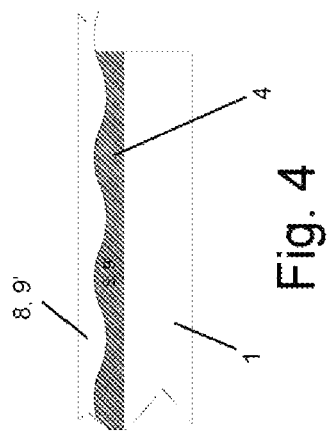
FIG. 4 shows a schematic view at a time of obtaining a negative raised pattern on the overlay product applied onto the substrate.
Figure 5:
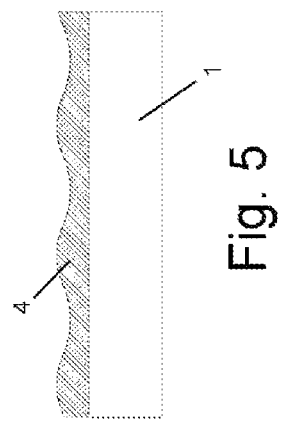
FIG. 5 shows a schematic view of the substrate with the negative raised pattern.
Figure 2:
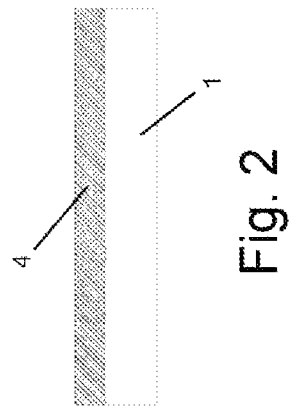
FIG. 2 shows a schematic view of a substrate with an overlay product applied onto the same.
Figure 3:
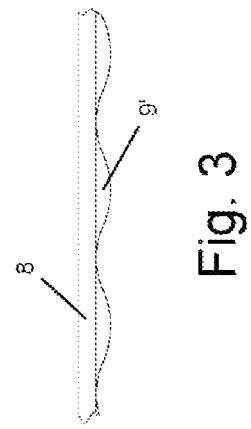
FIG. 3 shows a schematic view of a film with a positive raised pattern.
Figure 6:
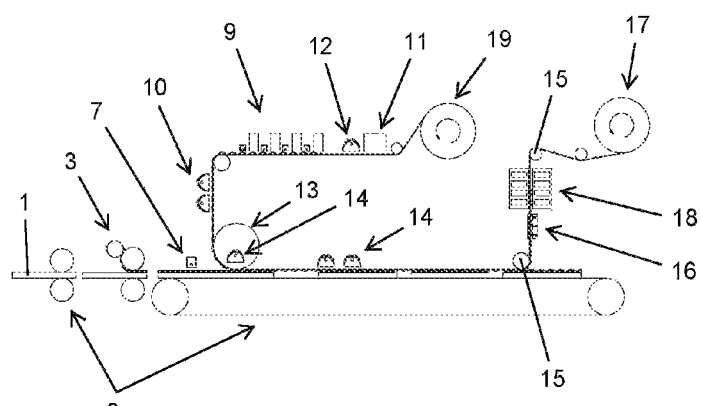
Figure 7:
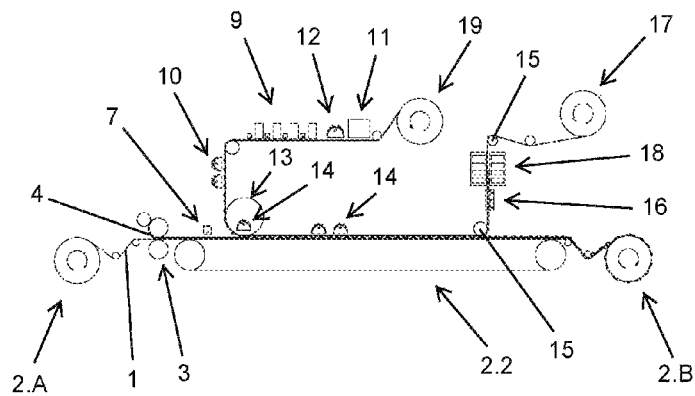
Figure 8:
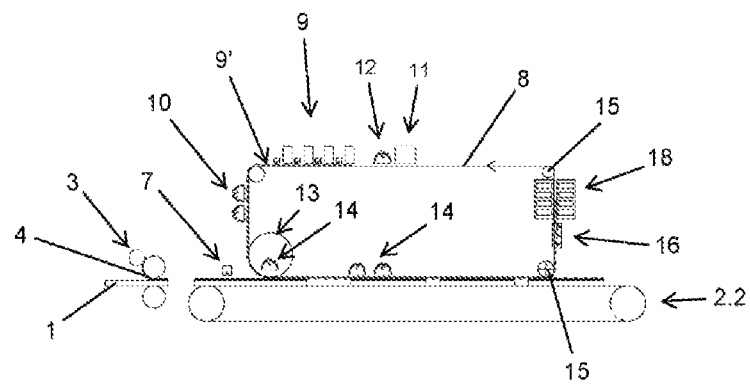
Figure 9:
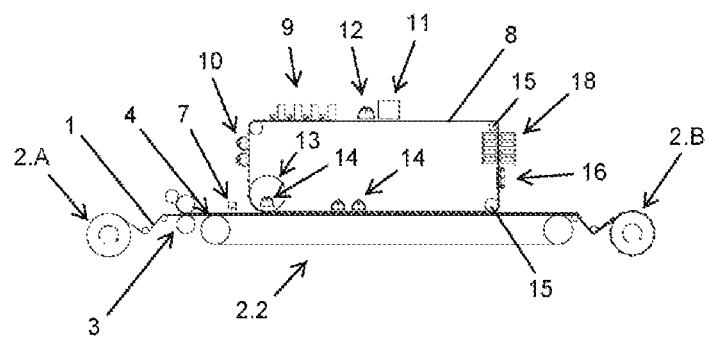
Figure 10:
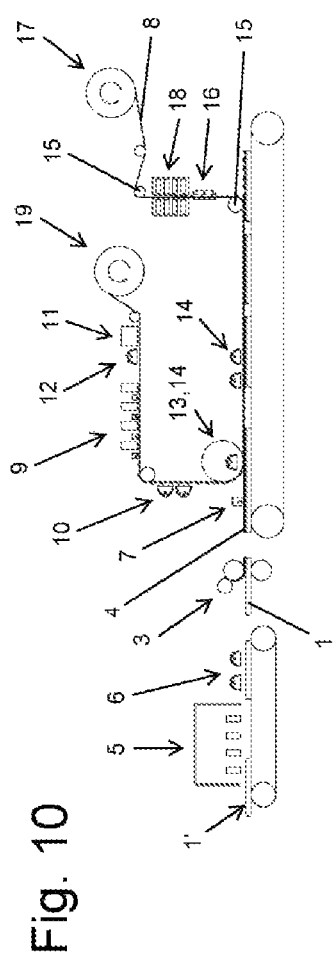
Figure 11:
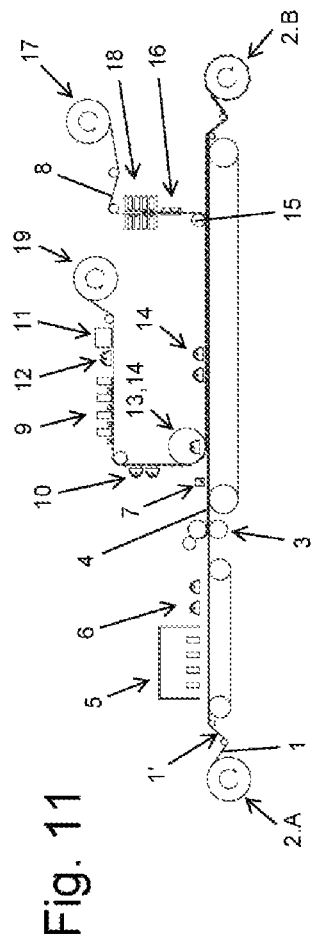

The present invention relates to a method for obtaining a raised pattern on a substrate (1), and more specifically on a face (1') of the substrate (1), and to a device for obtaining the raised pattern on the substrate (1) by means of applying said method. The substrate (1) is preferably flat.

The present method enables greater flexibility to be obtained both when providing the desired raised pattern and when defining it. In this manner, the substrate (1) obtained lacks limitations with regards to the raised pattern to be arranged on it, being able to vary constantly without repeating a pattern. Furthermore, the raised pattern is applicable, being varied in the definition thereof without requiring stoppages in the operation of the device or application of the method, or replacement of elements or parts of said device.

According to one option, the substrate (1) is configured as an independent or finite unit, such that they can be fed with a separation between two consecutively supplied substrates. For example, the substrate (1) is a panel, a plank or a slab of a material that can be selected from, for example, wood (chipboard, medium-density fibres "MDF", high-density fibres "HDF" or plywood), plastic (PVC, PET, PS, ABS, PC or PP), cellulose-based material (paper or cardboard), composite material (SPC or WPC) and metal. This configuration of the substrate (1) can be seen, for example, in FIGS. 1, 6, 8, 10 and 12.

According to another option, the substrate (1) is configured as a continuous unit. The substrate (1) is made of a material that can be selected from, for example, paper, cardboard, plastic, metal, wood, with or without melamine, and any other material able to be rolled or supplied continuously, being able to be arranged as a laminate, plate or slab. This configuration of the substrate (1) can be seen in FIGS. 7, 9, 11 and 13.

Moreover, the method comprises supplying a film (8), as a layer of plastic material. The film (8) comprises a first face (8.1) and a second face (8.2), these being preferably smooth, in other words, free of structures, projections, protrusions and any other type of surface irregularity. Said film (8) is transparent such that radiation passes through it, which for example can be UV, UV-LED, EB, hot air or infrared.

This supply is given such that the film (8) is moved by projection means (9), which by using digital inkjet printing technology eject or project a raised-pattern product (9') onto the film (8) so as to be arranged on the first face (8.1) thereof (8). This raised-pattern product (9') can be cured by applying energy, preferably by applying radiation, which for example can be UV, UV-LED, EB, hot air, infrared, etc.

Thus, by means of the projection means (9) a positive raised pattern is available, continuously, on the film (8). In other words, the positive raised pattern is arranged on the film (8) by the projection means (9). In this manner, the present method further provides the option of generating the raised pattern in a variable manner at any given time, further preventing the need to change reels, rollers or any other element.

The device comprises control means configured to define the positive raised pattern to be generated on the film (8) by using digital inkjet printing technology used by the projection means (9) in real time. In this manner, the flexibility with regards to the definition of the raised pattern to be transferred to the substrate (1), as well as the time at which it is defined, is complete. Said raised pattern can be generated without a pattern which is repeated over time.

Once the raised-pattern product (9') has been applied, the method comprises a movement of the film (8) from the projection means (9) to fixing means (10). The fixing means (10) are configured to carry out an application of radiation, which for example can be UV, UV-LED, EB, hot air, infrared, etc. Thus, by means of the fixing means (10), the raised-pattern product (9') is cured, fixed, dried or hardened such that it is maintained in a fixed manner on the film (8). In other words, the fixing means (10) bond the positive raised pattern on the film (8). In this manner, the positive raised pattern is generated by the projection means (9) and permanently bonded by the fixing means (10).

Optionally, the method comprises applying a primer onto the film (8), and more specifically on the first face (8.1) intended to receive the raised-pattern product (9'), before said raised-pattern product (9') is applied. In other words, before the film (8) is moved by the projection means (9), the film (8) is moved to primer application means (11) configured to apply the primer such that a suitable grip of the raised-pattern product (9') is provided to the film (8).

The primer application means (11) are conventional. The primer application means (11) can use digital inkjet printing technology, a set of rollers (an applicator roller, a dosing roller and a counter-pressure roller), at least one curtain, a gun, a spray or an aerosol.

According to this last option, immediately after the primer application means (11), following according to a direction and orientation of movement of the film (8) for applying the method, there are setting means (12) for setting or drying the primer on the film (8) such that it is fixed on the first face (8.1) thereof (8). Said setting means (12) and primer application means (11) are schematically represented in FIGS. 6 to 13.

Moreover, although simultaneously, the substrate (1) is moved to the device used, as well as by itself, in order to carry out the method by means of movement means (2). These movement means (2) are conventional, both for the case of movement of the substrates (1) as independent units and of the substrates (1) as continuous units.

In the case of the substrates (1) as independent units, the movement means (2) have a first portion (2.1) configured to move the substrates (1) to the device as the beginning of the method, in other words, as feed means. This first portion (2.1) is schematically represented in FIG. 1. Likewise, in this case the movement means (2) have a transport portion (2.2) configured to move the substrates (1) through the device while it is being treated so as to be provided with the corresponding raised pattern.

The transport portion (2.2) is additionally configured to provide an outlet for the substrate (1) obtained, in other words, with the corresponding raised pattern arranged and completely fixed, to other production processes, which for example use a machine for applying finishing products.

Optionally, in the case of the substrates (1) as continuous units, the movement means (2) have a starting element (2.A), preferably configured from a roll or a reel, from which the substrate (1) starts continuously. This starting element (2.A) is arranged such that it rotates in order to enable the movement of the substrate (1) first to the device, as feed means, and later by the device while it is being treated so as to be provided with the corresponding raised pattern.

Additionally, the movement means (2) have a collection element (2.B), preferably configured from another roll or another reel, wherein the substrate (1) is collected and rolled after the method has been applied to it, and therefore be equipped with the corresponding raised pattern. In this case, the movement means further comprise the transport portion (2.2) described above.

The starting element (2.A) and the collection element (2.B) include an arrow in the figures indicating the direction of thereof, and therefore the direction of movement of the substrate (1).

In this latter case, and alternatively, the movement means (2) lack the starting element (2.A) and the collection element (2.B) since the device is configured to receive the substrates (1) continuously coming from other production processes, which for example use an extruder, laminator, etc., and to provide an outlet for the substrate (1) obtained, in other words, with the corresponding raised pattern arranged and completely fixed, to other production processes, which for example use a machine for applying finishing products.

The device comprises application means (3) for applying an overlay product (4). The application means (3) are conventional. Preferably, the overlay product (4) is applied in a liquid state. Accordingly, the application means (3) are configured to apply the overlay product (4) according to the liquid state thereof.

Preferably, the application means (3) comprise another set of rollers (another applicator roller, another dosing roller and another counter-pressure roller). Alternatively, the overlay product (4) can be applied by using digital inkjet printing technology, at least one curtain, a gun, a spray or an aerosol.

The overlay product (4) can be selected from any varnish, lacquer and polymerisable resin. Accordingly, the overlay product (4) can be reactive polyurethane. Additionally, the overlay product (4) can be cured by applying energy, preferably by applying radiation, which for example can be UV, UV-LED, EB, hot air, infrared, etc., or it can be cured by chemical polymerisation either due to them being materials with two components or materials with other polymerisation mechanisms such as reactive polyurethane. Accordingly, the application means (3) are configured to apply the overlay product (4), this being the aforementioned reactive polyurethane.

According to one option, the substrate (1) is fed to the device, for example from the first portion (2.1) or from the starting element (2.A) or from the corresponding production process, with a print previously arranged on the face (1') thereof (1); while according to another option, the method comprises printing and drying said print on the substrate (1), and more specifically on the face (1') of the substrate (1). In other words, once the substrate (1) is fed to the device, it (1) is first moved to printing means (5), which are configured to print the print on the face (1') of the substrate (1), and to drying means (6), which are configured to dry said print on said face (1').

These drying means (6) and these printing means (5) are comprised in the present device. Said drying means (6) are arranged immediately after the printing means (5), according to a direction and orientation of movement of the substrate (1) for applying the method. The printing means (5) and the drying means (6) are schematically represented in FIGS. 10 to 13.

The printing means (5) preferably use digital inkjet printing technology to eject ink and thus perform the printing. Alternatively, these means (5) use rotogravure, offset, flexography or another similar technology. The drying means (6) apply energy, preferably by applying radiation, which for example can be UV, UV-LED, EB, hot air, infrared, etc.

Additionally, and when the method comprises printing and drying the print on the substrate (1), the control means are additionally configured to synchronise the performance of said printing with the ejection or projection of the raised-pattern product (9') onto the film (8). Thus, the need to use elements for reading the beginnings of the substrates (1) or for viewing and detecting the prints, etc., in addition to the corresponding complex calculations, is avoided.

Therefore, and by using the control means, the method comprises defining the positive raised pattern to be generated on the film (8) by using digital inkjet printing technology, in addition to optionally synchronising the ejection or projection of the raised-pattern product (9') onto the film (8) with the performance of the printing. In turn, also by using the control means, the method comprises defining the positive raised pattern of the film (8) such that, according to the properties of the overlay product (4) and of the raised-pattern product (9'), as well as the curing or drying to which they are subjected, the raised pattern to be obtained in the final product is determined, in other words, a negative raised pattern to be obtained in the substrate (1) is determined.

Thus, once there is information that defines a design of the print and the raised pattern to be represented on the substrate (1), specifically in the control means, in order to be seen both visually and haptically, this information is sent, specifically by said control means, both to printing means (5) and to the projection means (9), such that synchronisation of said means (5, 9) with each other is established.

According to the method, the overlay product (4) is applied, for which there are three preferences; in other words, a first, a second, and a third preference. According to the first of these preferences, the application means (3) are arranged to apply the overlay product (4), preferably as a layer, only onto the face (1') of the substrate (1). In this manner, said overlay product (4) is applied or arranged only on the face (1') of the substrate (1). See FIGS. 1 and 6 to 13. According to this first preference, in addition to the options described, said face (1') may or may not have the print performed and dried by means of the printing means (5) and the drying means (6).

Figure 14:
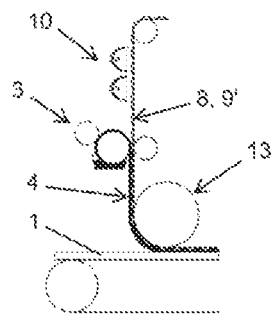
FIGS. 14 to 23 show partial schematic views of the device for obtaining raised patterns on substrates object of the invention, according to several exemplary embodiments.
Figure 15:
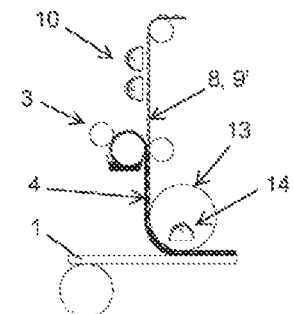
Figure 16:
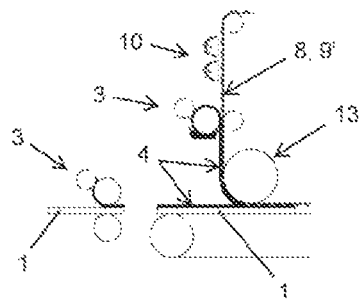
Figure 17:
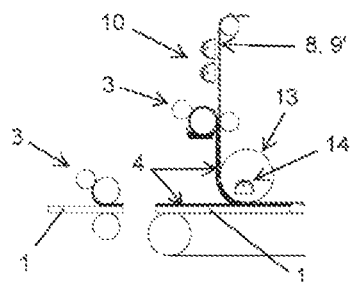
Figure 18:
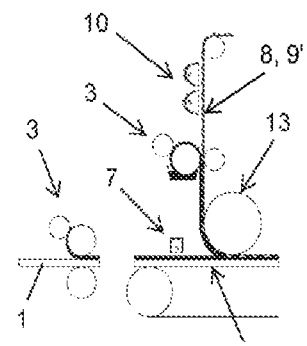
Figure 19:
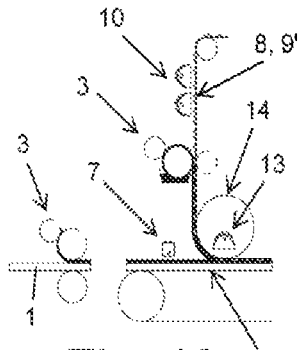

According to the second of these preferences, the application means (3) are arranged to apply the overlay product (4), preferably as a layer, only onto the first layer (8.1) of the film (8), and therefore also onto the positive raised pattern generated and fixed on said first layer (8.1). In this manner, the overlay product (4) is applied or arranged only on the first layer (8.1) of the film (8). See FIGS. 14 and 15. Thus, furthermore, the negative raised pattern is simultaneously obtained on said product (4) by contact against the positive raised pattern located on the first layer (8.1) and against the first layer (8.1) itself.

According to the third of these preferences, the application means (3) are arranged to apply the overlay product (4), preferably as a layer, both onto the face (1') of the substrate (1), with or without the print, and onto the first layer (8.1) of the film (8), and therefore also onto the positive raised pattern generated and fixed on said first layer (8.1). In this manner, the overlay product (4) is applied or arranged both on the face (1') of the substrate (1), with or without the print, and on the first layer (8.1) of the film (8) wherein the positive raised pattern is located. Thus, furthermore, the negative raised pattern is simultaneously obtained on said product (4) by contact against the positive raised pattern located on the first layer (8.1) and against the first layer (8.1) itself. See FIGS. 16 to 19. This preference is a combination of the previous two.

Once the overlay product (4) has been applied, according to the first or third of the described preferences, the method optionally comprises a movement of the substrate (1) from the application means (3) with the overlay product (4) to semi-curing means (7). The semi-curing means (7) are configured to carry out an application of radiation, which for example can be UV, UV-LED, EB, hot air, infrared, etc., such that the overlay product (4) is only partially cured, in other words, it is gelled, and therefore maintaining capacity for plastic deformation.

This stage of partial curing or fixing of the overlay product (4) which optionally comprises the present method is carried out, if appropriate, depending on the very properties of the overlay product (4), further depending on the features and properties of the raised pattern to be obtained on said product (4). Thus, if this stage occurs, it takes place, for example, when the overlay product (4) requires partial curing or drying in order to be plastically deformable such that the raised pattern is able to be generated.

According to the first of the described preferences, the supply of the film (8) and the movement of the corresponding substrate (1) continue such that the positive raised pattern bonded on the film (8) and the layer of the overlay product (4) on the substrate (1), respectively, are simultaneously moved to transfer means (13). These transfer means (13) are configured to transfer the positive raised pattern onto the substrate (1), and more specifically onto the overlay product (4) arranged on the face (1') of the substrate (1), such that the negative raised pattern is obtained.

According to this first preference, the method comprises complete fixing or curing of the overlay product (4) such that it maintains or bonds the negative raised pattern on it (4). This complete fixing of the overlay product (4) preferably occurs with said overlay product (4) in turn being in contact with both the positive raised pattern located on the film (8) and with the film (8) itself, such that the negative raised pattern is completely fixed or cured being free from contact with air, and more specifically from oxygen. This ensures a more precise transfer of the raised pattern, in addition to said curing being performed more efficiently.

According to the second of the described preferences, the supply of the film (8) and the movement of the corresponding substrate (1) continue such that said substrate (1) and the positive raised pattern bonded on the film (8) together with the layer of the overlay product (4) applied onto the first layer (8.1) of the film (8), and therefore also onto the positive raised pattern, are simultaneously moved to the transfer means (13). According to this second possibility, these transfer means (13) are configured to transfer the overlay product (4) of the film (8) with the negative raised pattern previously obtained on it (4) onto the face (1') of the substrate (1). In this manner, both the negative raised pattern and the overlay product (4) are simultaneously arranged or obtained on the face (1') of the substrate (1).

According to this second preference, the method comprises the complete fixing or curing of the overlay product (4) such that it maintains or bonds the negative raised pattern on it (4). This complete fixing of the overlay product (4) occurs with said overlay product (4) in turn being in contact with the face (1) of the substrate (1). Furthermore, this complete fixing of the overlay product (4) preferably occurs with said overlay product (4) in turn being in contact with both the positive raised pattern located on the film (8) and with the film (8) itself, such that the negative raised pattern is completely fixed or cured being free from contact with air, and more specifically from oxygen.

According to the third of the described preferences, the supply of the film (8) and the movement of the corresponding substrate (1) continue such that said substrate (1) and the positive raised pattern bonded on the film (8) together with the layer of the overlay product (4) applied both onto the face (1') of the substrate (1) and onto the first layer (8.1) of the film (8), and therefore also onto the positive raised pattern, are simultaneously moved to the transfer means (13). According to this third possibility, these transfer means (13) are configured to transfer the overlay product (4) of the film (8) with the negative raised pattern previously obtained on it (4) onto the overlay product (4) arranged on the face (1') of the substrate (1). In this manner, both the overlay product (4) of the film (8) and the negative raised pattern of this product (4) are simultaneously arranged on the overlay product arranged on the face (1') of the substrate (1).

According to this third preference, the method comprises the complete fixing or curing of the overlay product (4) such that it maintains or bonds the negative raised pattern on it (4). This complete fixing of the overlay product (4) occurs with the overlay products (4) of the film (8) and of the substrate (1) forming a unit while the negative raised pattern is maintained. Furthermore, this complete fixing of the overlay product (4) preferably occurs with said overlay product (4) in turn being in contact with both the positive raised pattern located on the film (8) and with the film (8) itself, such that the negative raised pattern is completely fixed or cured being free from contact with air, and more specifically from oxygen.

According to the three preferences, the method comprises moving the substrate (1) and the film (8) such that they reach the transfer means (13) and curing means (14) arranged to completely fix or cure the overlay product (4) such that the overlay product (4) is solidified and bonded with the negative raised pattern onto the face (1') of the substrate (1).

The curing means (14) are configured to carry out an application of radiation, which is preferably UV or UV-LED; although alternatively it can be EB, hot air or infrared. The curing means (14) are especially effective due to the preferential arrangement of the positive raised pattern, and therefore of the film (8), in contact with the overlay product (4) since it significantly reduces, or even eliminates, the air which can be located between said film (8) and said overlay product (4).

According to one possibility, the transfer means (13) and the curing means (14) are arranged such that the curing means (14) are located after the transfer means (13). In this manner, the transfer means (13) act first and then the complete curing means (14) act. According to this possibility, the transfer means (13) are a roller configured to exert a controlled pressure on the film (8) and against the overlay product (4). See FIG. 1 as an example.

According to another possibility, the transfer means (13) and the curing means (14) are arranged such that they act simultaneously. See for example FIGS. 6 to 13. According to this other possibility, the transfer means (13) are a roller configured to exert a controlled pressure on the film (8) and against the overlay product (4), while enabling the curing means (14) to be housed therein in order to perform curing on the overlay product (4). In this manner, this roller comprises a transparent perimeter contour such that the radiation passes through it, which is preferably UV or UV-LED; although alternatively it can be EB, hot air or infrared.

Likewise, also according to this other possibility, the method may comprise using the curing means (14) again, after the pass, obviously from each longitudinal point, of the substrate (1) and the film (8) by the roller with the curing means (14) therein. In other words, the curing means (14) are arranged according to at least two different locations or positions.

This takes place, for example, to ensure the complete curing or to shorten the complete curing time of the overlay product (4), the negative raised pattern being maintained. Preferably, this curing by means of the curing means (14) according to different locations occurs, preferably, with the overlay product (4) being in contact with the positive raised pattern located on the film (8), in addition to the face (1') of the substrate (1).

Said curing means (14) in a location different from the one inside the roller, or the transfer means (13), are arranged such that they exert curing of the overlay product (4) after exerting the pressure by the transfer means (13) and the curing of the overlay product (4) simultaneously.

On the one hand, the present method can comprise a collection or storage of the substrate (1), the film (8), and therefore the positive raised pattern contained on said film (8), being maintained in contact with the completely cured overlay product (4).

On the other hand, the present method can comprise the movement of the film (8), once the complete curing or the complete fixing of the overlay product (4) has been performed, maintaining the negative raised pattern provided by the film (8), such that it is distanced or separated with respect to the overlay product (4). In other words, the method may comprise detaching the film (8), and therefore also the positive raised pattern that it carries, from the overlay product (4).

To do so, the device comprises removal means (15). Preferably, the removal means (15) are configured as one or more guiding rollers, and more preferably as at least two guiding rollers, around which the film (8) is moved such that they define a direction of movement forming an angle with respect to that of the substrate (1).

In this manner, by means of the present method, the substrate (1) is obtained with the desired raised pattern on the face (1') thereof. Thus, the substrate (1) can be collected unit by unit, which can be rolled in the collection element (2.B) carrying the predefined raised pattern or be moved towards the other corresponding production processes.

As previously indicated, preferably, in correspondence with the curing means (14) the overlay product (4) is in contact with the positive raised pattern located on the film (8) in order to ensure the transfer of the raised pattern, positive or negative according to the preference, in a completely precise manner, the curing means (14) furthermore being especially effective due to the arrangement of the positive raised pattern, and therefore of the film (8), in contact with the overlay product (4) since it significantly reduces, or even eliminates, the air which can be located between said film (8) and said overlay product (4).

However, alternatively, the method may comprise detaching the film (8) as described, and therefore also the positive raised pattern that it carries, from the overlay product (4) before the complete fixing or curing of the overlay product (4) such that it is solidified, maintaining the overlay product (4) bonded with the negative raised pattern onto the face (1') of the substrate (1).

Figure 22:
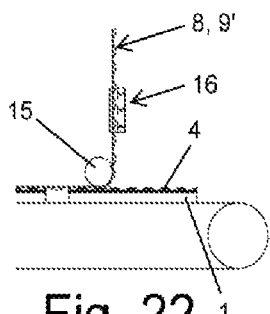
Figure 23:
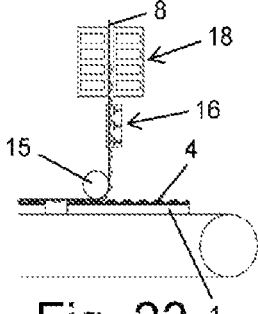

According to this alternative, preferably the present device lacks or dispenses with the curing means (14), these (14) being located after the removal means (15), according to the direction and the orientation of movement of the substrate (1) for applying the method. See FIGS. 22 and 23. In this manner, the device comprises a resting area for exposing the overlay product (4) with the negative raised pattern on the face (1') of the substrate (1) to the air for a required time such that the complete curing is carried out.

Thus, the present method comprises the complete fixing or curing of the overlay product (4) such that it is solidified, maintaining the overlay product (4) bonded with the negative raised pattern onto the face (1') of the substrate (1) by means of exposure at room temperature corresponding to the location of the device for a required time. This alternative provides a result such as the one that can be obtained by means of the preferred manner when the overlay product (4) is reactive polyurethane.

Figure 20:
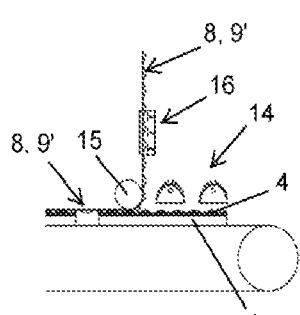
Figure 21:
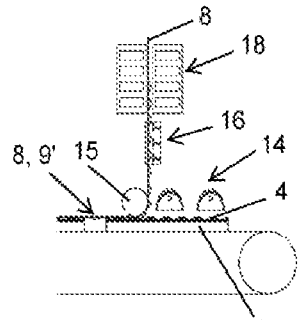

According to this alternative, according to another possibility in the present device the curing means (14) are located after the removal means (15), according to the direction and the orientation of movement of the substrate (1) for applying the method. See FIGS. 20 and 21. This alternative provides a result such as the one that can be obtained by means of the preferred manner when the overlay product (4) is reactive polyurethane.

The film (8), moreover, once it is detached or separated with respect to the overlay product (4), is moved to cleaning means (16). This provides the possibility of reusing the film (8) with the positive raised pattern generated and bonded on it (8). These means (16) are configured to clean the first face (8.1) of the film (8) containing the positive raised pattern, said raised pattern being maintained on the film (8) and the overlay product (4) being eliminated. These cleaning means (16) are preferably a combination of blowing elements (rotating and/or curtain) with suction elements and/or elements which eliminate static (such as deionising barriers).

Optionally, the method comprises moving the film (8) from the cleaning means (16) to disposal means (18). The disposal means (18) are configured to withdraw, remove or eliminate the positive raised pattern from the film (8). Thus, the film (8) can once again be used according to the present method.

Accordingly, these disposal means (18) are configured to apply a solvent onto the positive raised pattern and for a subsequent cleaning and drying. Additionally or alternatively, said disposal means (18) are configured to use a scraper element such that the positive raised pattern is mechanically separated from the film (8). Optionally, the disposal means (18) are configured for, additionally or alternatively to what is described, applying ultrasound.

Preferably, at least the cleaning means (16) are located such that they are between the guiding rollers which form the removal means (15), and more preferably, both the cleaning means (16) and the disposal means (18) are located between the guiding rollers which form the removal means (15). Both when the removal means (15) are one guiding roller and when there are two or more, these means (15) are arranged providing by means of a single change in the direction of movement of the film (8) that it (8) is detached from the overlay product (4), cleaned of possible remains of said product (4) and released from the positive raised pattern.

According to one example, and as represented in FIGS. 6, 7, 10 and 11, the method further comprises moving the film (8) from the disposal means (18) to a collection element (17) arranged to collect the film (8).

According to this example, in addition to the configuration of the device corresponding to FIG. 1 wherein the film (8) is moved directly from the cleaning means (16) to the collection element (17), the device comprises supply means for supplying the film (8), which are preferably configured to provide the supply of the film (8) by unwinding thereof.

Preferably, both the collection element (17) and a supply element (19) are comprised in the supply means. The collection element (17) and the supply element (19) include an arrow in the figures indicating the direction of rotation thereof. Said elements (17, 19) are arranged such that they rotate in order to enable the supply or movement of the film (8), first as feed means, later by the rest of the device in order for the corresponding raised pattern to be transferred to it and finally for the collection or rolling thereof.

According to another example, and as represented in FIGS. 8, 9, 12 and 13, the method comprises once again moving the film (8) from the disposal means (18) to the primer application means (11), or, in the absence thereof, directly to the projection means (9), in order to once again eject or project the raised-pattern product (9') onto the film (8), once again generating a positive raised pattern on the same film (8), and more specifically on the same first face (8.1). In this manner, the supply of the film (8) occurs according to a closed path.

This configuration of the closed path of the film (8) entails dispensing with both the collection element (17) and the supply element (19). In this case, the supply means are the removal means (15), the transfer means (13) and/or some towing element arranged in order to perform said function. According to the closed path or closed extension of the film (8), the direction of rotation of the film (8) being represented by an arrow in FIGS. 8, 12 and 13, the supply of the film (8) is completely continuous.

The invention claimed is:

1. A method for obtaining a raised pattern on a substrate comprising the following steps:
   moving a substrate having one face;
   concurrently supplying a film having a first face;
   projecting onto the first face a raised-pattern product using digital printing technology so as to generate a positive raised pattern on the first face;
   fixing the positive raised pattern on the first face of the film;
   applying an overlay product onto the one face of the substrate and/or on the first face of the film;
   obtaining a negative raised pattern on the overlay product by contact with the positive raised pattern;
   fixing the negative raised pattern on the one face of the substrate.

2. The method according to claim 1, wherein a print is arranged on the one face of the substrate such that generation of the positive raised pattern and arrangement of the print are performed in a synchronized manner.

3. The method according to claim 1, wherein obtaining the negative raised pattern and fixing the negative raised pattern occur simultaneously.

4. The method according to claim 1, wherein once the negative raised pattern has been obtained on the overlay product, the negative raised pattern is fixed.

5. The method according to claim 1, wherein supply of the film occurs according to an endless loop.

6. The method according to claim 1, wherein the film is removed with respect to the substrate after completely curing the overlay product with the negative raised pattern on the one face of the substrate.

7. The method according to claim 1, wherein the film is removed with respect to the substrate before completely curing the overlay product with the negative raised pattern on the one face of the substrate.

8. The method according to claim 1, wherein the overlay product is eliminated from the film once the negative raised pattern has been fixed.

9. The method according to claim 1, wherein the positive raised pattern is eliminated from the film once the negative raised pattern has been fixed.

10. The method according to claim 1, wherein the overlay product is applied onto the one face of the substrate.

11. The method according to claim 1, wherein the overlay product is applied onto the film on the first face.

* * * * *